US009892706B2

(12) United States Patent
Ishii et al.

(10) Patent No.: US 9,892,706 B2
(45) Date of Patent: Feb. 13, 2018

(54) SEMICONDUCTOR DEVICE FOR MITIGATING THROUGH CURRENT AND ELECTRONIC APPARATUS THEREOF

(71) Applicant: Synaptics Japan GK, Tokyo (JP)

(72) Inventors: Noriyuki Ishii, Tokyo (JP); Atsushi Shikata, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 38 days.

(21) Appl. No.: 15/071,948

(22) Filed: Mar. 16, 2016

(65) Prior Publication Data

US 2016/0284309 A1 Sep. 29, 2016

(30) Foreign Application Priority Data

Mar. 25, 2015 (JP) ................................ 2015-062629

(51) Int. Cl.
*G09G 5/00* (2006.01)
*G06F 3/038* (2013.01)
*G09G 3/36* (2006.01)

(52) U.S. Cl.
CPC ....... *G09G 3/3696* (2013.01); *G09G 2330/02* (2013.01)

(58) Field of Classification Search
CPC .................................................. G09G 3/3696
USPC ........................................................ 345/212
See application file for complete search history.

(56) References Cited

U.S. PATENT DOCUMENTS

2008/0150860 A1* 6/2008 Hong .................. G09G 3/3677 345/87
2009/0009446 A1* 1/2009 Kamijo ................ G09G 3/3655 345/87
2009/0040244 A1* 2/2009 Lee ...................... G09G 3/3696 345/690
2015/0194121 A1* 7/2015 Lee ...................... G09G 3/3266 345/212
2016/0005376 A1* 1/2016 Joo ................... H02M 3/33523 345/212

FOREIGN PATENT DOCUMENTS

JP H08320740 A 12/1996

* cited by examiner

*Primary Examiner* — Long D Pham
(74) *Attorney, Agent, or Firm* — Patterson + Sheridan, LLP

(57) ABSTRACT

A semiconductor device has a first mode in which the semiconductor device is used alone and a second mode in which the semiconductor device is used in combination with another semiconductor device. Incase that one driven device is driven using the semiconductor device in the first mode and the second mode, power supply lines are caused to allow electrical conduction to each other outside of each semiconductor device in order to cancel errors of operation power supply voltages of each semiconductor device. In case that a power supply unit of each semiconductor device is operable by receiving an instruction for release of a low power consumption state, a supply start timing of the operation power supply voltages in the second mode is delayed as compared to that in the first mode.

21 Claims, 8 Drawing Sheets

SEMICONDUCTOR DEVICE FOR MITIGATING THROUGH CURRENT AND ELECTRONIC APPARATUS THEREOF

CROSS-REFERENCE TO RELATED APPLICATIONS

The present application claims priority from Japanese patent application number JP 2015-062629, filed on Mar. 25, 2015, the content of which is hereby incorporated by reference into this application.

FIELD

The invention generally relates to a semiconductor device capable of driving a driven device alone or in combination with another semiconductor device, and an electronic apparatus that drives one driven device using a plurality of the semiconductor devices, and relates to, for example, a technique effective in a case of application to a display driver which is used for display drive of a panel.

BACKGROUND

A display driver that drives a display panel generates a gradation voltage or a gate drive voltage using a plurality of power supplies that is higher than the voltage of an operation power supply of a logic unit. A DCDC converter or a charge pump circuit is used in a power supply circuit that generates such a drive operation power supply from an external power supply. Currently, a plurality of display drivers may be used for driving a display panel due to an increase in the size of the display panel or high chroma. In this case, a display region is divided and different display drivers are used to drive the divided display regions. In case that a low power consumption state such as a sleep mode is designated, the display driver stops the supply of the operation power supplied from the power supply circuit to enter a low power consumption state. In case that release of the low power consumption state is designated, the supply of the drive power supply is restarted by bringing the power supply circuit back into operation. In this case, in case that a plurality of display drivers start the supply of the operation power supplies simultaneously, an in-rush current is generated, and a peak current increases. Such a sudden current change makes electro-magnetic interference (EMI) worse and causes an undesired voltage drop. JP-A-8-320740 discloses that power supply timings of a plurality of devices or apparatuses are shifted for the purpose of overlapping prevention of a peak current. In case that the supply start timing of a power supply is shifted for each display driver by applying this point, it is possible to suppress the increase in the peak current.

SUMMARY

A semiconductor device and electronic apparatus are provided herein. In one example, a semiconductor device includes a power supply unit, a drive unit, an external interface unit, and a control unit. The semiconductor device has a first mode and a second mode. The drive unit is configured to output a plurality of drive signals using a plurality of operation power supply voltages which are supplied from the power supply unit. The external interface unit is configured to input a command and data from an outside device. The control unit is configured to control an output operation of the drive signals which is performed by the drive unit, the control unit configured to control supply and cutoff of the operation power supply voltages to the drive unit which are performed by the power supply unit. The semiconductor device also includes an external power supply terminal capable of connecting a power supply line of the operation power supply voltages to an outside device external of the semiconductor device. The control unit is configured to cutoff the operation power supply voltages by both supply stop of the operation power supply voltages and discharge of the power supply line. The control unit is also configured to supply operation power supply voltage by both supply start of the operation power supply voltages and discharge release of the power supply line. The control unit is further operable to control timings of the supply stop of the operation power supply voltages, discharge start of the power supply line and the discharge release of the power supply line so as to be the same as each other in each of the first mode and the second mode, and delays a supply start timing of the operation power supply voltages in the second mode as compared to that in the first mode.

In another example, an electronic apparatus includes a plurality of semiconductor devices and a driven device in a state of connection to the plurality of semiconductor devices. Each of the semiconductor devices includes power supply unit, a drive unit, an external interface unit and a control unit. The drive unit is configured to output a plurality of drive signals using a plurality of operation power supply voltages which are supplied from the power supply unit. The external interface unit is configured to receive a command and data from an outside device. The control unit is configured to control an output operation of a drive signal which is performed by the drive unit and configured to control supply and cutoff of the operation power supply voltages to the drive unit which are performed by the power supply unit. The external power supply terminal is capable of connecting a power supply line of the operation power supply voltages to an outside device external of the semiconductor device. The control unit is operable to cutoff operation power supply voltages by both stopping the operation power supply voltages and discharging the power supply line. The control unit is also operable to supply operation power supply voltage by both starting the operation power supply voltages and discharging release of the power supply line. The external power supply terminal of each of the semiconductor devices is connected in common to each corresponding power supply. The control unit in each of the plurality of semiconductor devices is operable to shift a supply start timing of the operation power supply voltages between the semiconductor devices, and controls timings of the supply stop of the operation power supply voltage, discharge start of the power supply line and the discharge release of the power supply lines so as to be the same as each other between the semiconductor devices.

DETAILED DESCRIPTION

Figure 1:
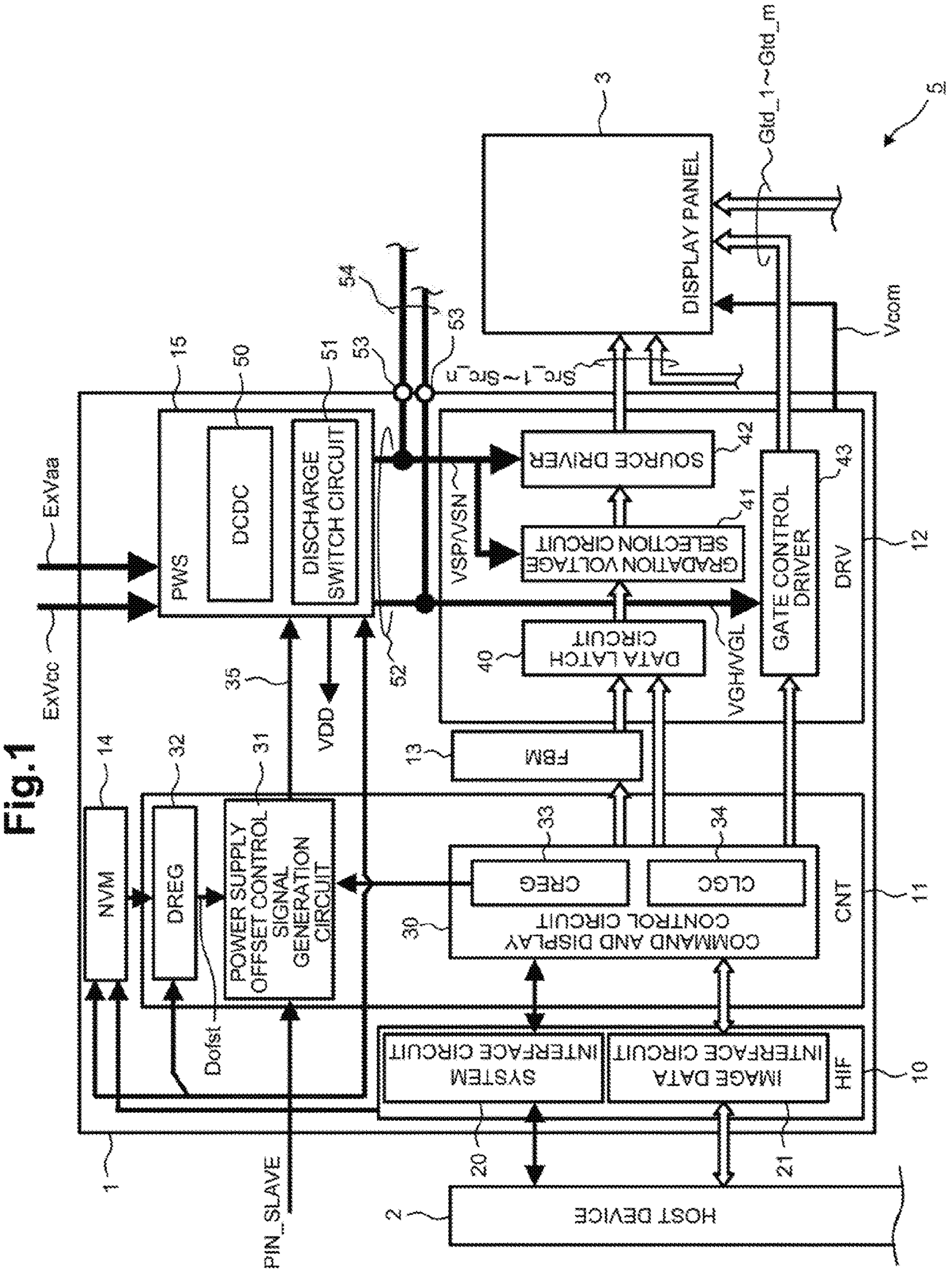
FIG. 1 is a block diagram illustrating a first example of a semiconductor device according to one embodiment of the invention.

The inventor has examined special circumstances in case that a plurality of display drivers are used for driving a display panel due to an increase in the size of the display panel or high chroma. In the case that a display region is divided and different display drivers are caused to take charge of drive thereof, the presence of a voltage difference in a drive operation power supply which is generated in each display driver causes the difference to appear as a luminance difference or a gradation difference between display regions, which leads to a deterioration in display quality. Consequently, the drive power supply voltages generated in each display driver are extracted from an external terminal to an external connection line to thereby allow electrical conduction, and are set to the same potential.

However, it has been clarified by the inventor that there are the following problems in case that the drive power supply voltages generated in each display driver are extracted to the outside to thereby allow electrical conduction through a connection line. That is, in the non-display state of a liquid crystal panel in a low power consumption state or the like, the power supply line of the drive power supply voltages is discharged to a ground voltage so that an undesired electric field is not applied to a liquid crystal display element. Discharge is performed by synchronizing a discharge switch connected to the power supply line with supply cutoff of the power supply, and release of the discharge is performed in synchronization with the supply of the power supply. Then, as described above, in case that timings of the supply and discharge release of the drive power supply are shifted between a plurality of display drivers, and some of the display drivers previously start the power supply to release the discharge, the remaining display drivers still maintain the power supply line to be in a discharge state. Since the power supply lines of the drive power supply voltages of each display driver are caused to allow electrical conduction to each other at the outside by the above connection line, a through-current flows from some of the display drivers toward discharge switches of the remaining display drivers, resulting in interference with power supply. In case that the same timing delay is generated between the liquid crystal drivers even during the cutoff of the drive power supply voltage, a through-current is generated similarly.

An advantage of the present disclosure is to provide a semiconductor device and an electronic apparatus which are capable of preventing a through-current from being generated between semiconductor devices even in the case that timings of power supply and discharge release are shifted between the semiconductor devices.

The above and other advantages and novel features of the invention will be made clearer from the description and the accompanying drawings of the present specification.

The following is a brief description of representative embodiments of the invention. Meanwhile, reference numerals and signs within the drawings and the like which are written in parentheses in the present items are an example for making the content easier to understand.

[1] Power Supply Discharge Release Timing is Made Invariable Between a Plurality of Modes and Power Supply Start Timing is Shifted A semiconductor device (1, 1A, 1B) according to embodiments of the invention includes: a power supply unit (15); a drive unit that outputs a plurality of drive signals using a plurality of operation power supply voltages (VSP, VSN, VGH, VGL) which are supplied from the power supply unit; an external interface unit (10) that inputs a command and data from an outside device external to the semiconductor device; and a control unit (11) that controls an output operation of the drive signals which is performed by the drive unit and controls supply and cutoff of the operation power supply voltages to the drive unit which are performed by the power supply unit. The semiconductor device includes an external power supply terminal (53) capable of connecting a power supply line of the operation power supply voltages to an outside device external of the semiconductor device. The cutoff of the operation power supply voltages is performed by both supply stop of the operation power supply voltages and discharge of the power supply line, and the supply of the operation power supply voltage is performed by both supply start of the operation power supply voltages and discharge release of the power supply line. The semiconductor device has at least a first mode and a second mode. The control unit controls timings of the supply stop of the operation power supply voltages, discharge start of the power supply line and the discharge release of the power supply line so as to be the same as each other in each of the first mode and the second mode, and delays a supply start timing of the operation power supply voltages in the second mode as compared to that in the first mode.

In case that one driven device is driven using the semiconductor device in the first mode and the semiconductor device in the second mode, it is assumed that the external power supply terminal of each semiconductor device is caused to allow electrical conduction between other in order to cancel errors of the operation power supply voltages of each semiconductor device. On this assumption, in case that the power supply unit of each semiconductor device in the first mode and the second mode is operable by receiving an instruction for the release of a low power consumption state or the like, the supply start timing of the operation power supply voltages in the second mode is delayed as compared to that in the first mode. Since an excessive in-rush current is prevented from being generated and the timings of discharge release of the power supply line become equal to each other between the semiconductor devices in the first mode and the second mode, there is no concern of a through-current flowing from one power supply unit to the other power supply unit due to a shift in the discharge release timing.

[2] Setting of First Mode and Second Mode

In item 1, the first mode or the second mode is determined by pull-up or pull-down of a predetermined external terminal.

Accordingly, the operating mode of the semiconductor device can be simply set by pull-up or pull-down.

[3] Setting of First Mode and Second Mode

In item 1, the first mode or the second mode is determined by mode data which is held by an electrically rewritable non-volatile storage device.

According to this, the operating mode of the semiconductor device can be simply set by write of mode data (REG_SLAVE) in the non-volatile storage device.

[4] Mode Setting According to Shift Amount of Power Supply Start Timing

In item 1, a register (32B) by which a shift amount of the power supply start timing is set to be variable is further included, and the control unit (11B) determines the first mode in case that the shift amount which is set by the register is zero, and determines the second mode in case that the shift amount which is set by the register is larger than zero.

According to this, both of the shift amounts of the power supply start timings in the mode setting and the second mode can be set collectively. Even in case that a plurality of semiconductor devices in the second mode are used, it is possible to similarly cope with this case by mutually changing the shift amounts.

[5] Shift Amount of Power Supply Start Timing is Set to be Variable

In item 2 or 3, a register (32, 32A, 32B) by which a shift amount of the power supply start timing is set to be variable is further included, and the register is rewritable from an outside device through the external interface unit.

Accordingly, even in the case that a plurality of semiconductor devices in the second mode are used, it is possible to similarly cope with this case.

[6] Soft Start

In item 1, the control unit temporarily halts and restarts a power supply operation after an elapse of a predetermined time (T) from power supply start from the power supply unit to the drive unit.

Accordingly, it is possible to further reduce a peak current during power supply start.

[7] Timing is Shifted Due to Difference in Delay Time from Event Generation to Power Supply Cutoff Start In item 1, in the first mode, the control unit starts the supply of the operation power supply voltages after an elapse of a first time from generation of a first event, releases the discharge of the power supply line, and starts the supply stop of the operation power supply voltages and the discharge of the power supply line after an elapse of a second time from generation of a second event. In the second mode, the control unit releases the discharge of the power supply line after an elapse of the first time from the generation of the first event, starts the supply of the operation power supply voltages after an elapse of a third time thereafter, and starts the supply stop of the operation power supply voltages and the discharge of the power supply line after an elapse of the second time from the generation of the second event.

Accordingly, the shift amount of the power supply start timing is specified due to the offset of the third time with respect to the second time.

[8] First Event, Second Event

In item 7, the second event is a setting instruction of a low power consumption mode for the drive unit based on a low power consumption mode setting command (SLPIN) which is supplied to the external interface unit, and the first event is a release instruction of a low power consumption mode for the drive unit based on a low power consumption mode release command (SLPOUT) which is supplied to the external interface unit.

Accordingly, it is possible to obtain an operational effect of item 1 during the setting and release of the low power consumption mode relating to the operation power supply voltages generated in the power supply unit.

[9] Shift in Power Supply Start (Discharge Release) Timing Between Operation Power Supply Voltages In item 7, the control unit shifts timings of the supply start of each operation power supply voltage and the discharge release of the power supply line between a plurality of operation power supply voltages, and generates operation power supply voltages, forming a pair, of which the polarities are different from each other and of which the voltage values are substantially equal to each other in terms of an absolute value, with respect to the supply stop of the operation power supply voltages and the discharge of the power supply line.

Accordingly, the power supply start timing and the discharge release timing are shifted between a plurality of operation power supply voltages, and thus a peak current is also reduced in this point.

[10] Liquid Crystal Driver

In item 1, the drive circuit outputs a drive signal for driving a plurality of liquid crystal display elements of a liquid crystal display panel (3) having the liquid crystal display elements disposed in a matrix.

Accordingly, it is possible to contribute to a reduction in peak current during the supply restart of the operation power supply voltages, with respect to a configuration in which burn-in prevention of the liquid crystal display elements or element characteristic deterioration prevention is performed by the power supply line discharge in a power supply cutoff state.

[11] Power Supply Discharge Release Timing is Made Invariable Between a Plurality of Semiconductor Devices and Power Supply Start Timing is Shifted An electronic apparatus (5, 5A, 5B) according to the invention includes: the plurality of semiconductor devices (1, 1A, 1B); and a driven device (3) which is driven in a state of connection to the plurality of semiconductor devices. Each of the semiconductor devices includes a power supply unit, a drive unit that outputs a plurality of drive signals using a plurality of operation power supply voltages which are supplied from the power supply unit, an external interface unit that inputs a command and data from an outside device, a control unit that controls an output operation of a drive signal which is performed by the drive unit and controls supply and cutoff of the operation power supply voltages to the drive unit which are performed by the power supply unit, and an external power supply terminal capable of connecting a power supply line of the operation power supply voltages to an outside device external of the semiconductor device. The cutoff of the operation power supply voltages is performed by both supply stop of the operation power supply voltages and discharge of the power supply line, and the supply of the operation power supply voltage is performed by both supply start of the operation power supply voltages and discharge release of the power supply line. The external power supply terminal of each of the semiconductor devices is connected in common to each corresponding power supply. The control unit in each of the plurality of semiconductor devices shifts a supply start timing of the operation power supply voltages between the semiconductor devices, and controls timings of the supply stop of the operation power supply voltage, discharge start of the power supply line and the discharge release of the power supply lines so as to be the same as each other between the semiconductor devices.

Accordingly, in case that one driven device is driven using a plurality of semiconductor devices, it is assumed that the external power supply terminals of each semiconductor device are caused to allow electrical conduction to each other in order to cancel errors of the operation power supply voltages of each semiconductor device. On this assumption, in case that the power supply unit of each semiconductor device is operable by receiving an instruction for the release of the low power consumption state or the like, the supply start timing of the operation power supply voltages is shifted between the semiconductor devices. Thereby, since an excessive in-rush current is prevented from being generated and the timings of discharge release of the power supply line become equal to each other between the semiconductor devices, there is no concern of a through-current flowing from one power supply unit to the other power supply unit due to a shift in the discharge release timing.

[12] Power Supply Start Timings are Shifted and Mode for Causing Power Supply Cutoff Start Timings to be Coincident with Each Other is Designated In item 11, the semiconductor device has a first mode and a second mode. The control unit controls the respective timings of the supply stop of the operation power supply voltages, the discharge start of the power supply line and the discharge release of the power supply line so as to be the same as each other between the first mode and the second mode, and delays a supply start timing of the operation power supply voltages in the second mode as compared to that in the first mode. The control unit includes a register by which a delay amount of the supply start timing of the operation power supply voltages is set to be variable, the register being rewritable from an outside device through the external interface unit.

According to this, in case that the power supply unit of each semiconductor device in the first mode and the second mode is operable by receiving an instruction for the release of a low power consumption state, the supply start timing of the operation power supply voltages in the second mode is delayed as compared to that in the first mode. Thereby, since an excessive in-rush current is prevented from being generated and the timings of discharge release of the power supply line become equal to each other between the semiconductor devices in the first mode and the second mode, there is no concern of a through-current flowing from one power supply unit to the other power supply unit due to a shift in the discharge release timing. Further, the register by which the shift amount of the power supply start timing is set to be variable is included, and thus the above operational effect is also obtained between a plurality of semiconductor devices in the second mode.

[13] Setting of First Mode and Second Mode

In item 12, the first mode or the second mode is determined by pull-up or pull-down of a predetermined external terminal.

According to this, the operating mode of the semiconductor device can be simply set by pull-up or pull-down.

[14] Setting of First Mode and Second Mode

In item 12, the first mode or the second mode is determined by mode data which is held by an electrically rewritable non-volatile storage device.

According to this, the operating mode of the semiconductor device can be simply set by write of mode data in the non-volatile storage device.

[15] Mode Setting According to Shift Amount of Power Supply Start Timing

In item 12, the control unit determines the first mode in case that the shift amount which is set by the register is zero, and determines the second mode in case that the shift amount which is set by the register is larger than zero.

According to this, both of the shift amounts of the power supply start timings in the mode setting and the second mode can be set collectively. Even in case that a plurality of semiconductor devices in the second mode are used, it is possible to similarly cope with this case by mutually changing the shift amounts.

[16] Soft Start

In item 11, the control unit temporarily halts and restarts a power supply operation after an elapse of a predetermined time from power supply start from the power supply unit to the drive unit.

According to this, it is possible to further reduce a peak current during power supply start.

[17] Timing is Shifted Due to Difference in Delay Time from Event Generation to Power Supply Cutoff Start In item 12, in the first mode, the control unit starts the supply of the operation power supply voltages after an elapse of a first time from generation of a first event, releases the discharge of the power supply line, and starts the supply stop of the operation power supply voltages and the discharge of the power supply line after an elapse of a second time from generation of a second event, and in the second mode, the control unit releases the discharge of the power supply line after an elapse of the first time from the generation of the first event, starts the supply of the operation power supply voltages after an elapse of a third time thereafter, and starts the supply stop of the operation power supply voltages and the discharge of the power supply line after an elapse of the second time from the generation of the second event.

According to this, the shift amount of the power supply start timing is specified due to the offset of the third time with respect to the second time.

[18] First Event, Second Event

In item 17, the second event is a setting instruction of a low power consumption mode for the drive unit based on a low power consumption mode setting command which is supplied to the external interface unit, and the first event is a release instruction of a low power consumption mode for the drive unit based on a low power consumption mode release command which is supplied to the external interface unit.

According to this, it is possible to obtain an operational effect of item 1 during the setting and release of the low power consumption mode relating to the operation power supply voltages generated in the power supply unit.

[19] Shift in Power Supply Start (Discharge Release) Timing Between Operation Power Supply Voltages In item 17, the control unit shifts timings of the supply start of each operation power supply voltage and the discharge release of the power supply line between a plurality of operation power supply voltages, and generates operation power supply voltages, forming a pair, of which the polarities are different from each other and of which the voltage values are substantially equal to each other in terms of an absolute value, with respect to the supply stop of the operation power supply voltages and the discharge of the power supply line.

According to this, the power supply start timing and the discharge release timing are shifted between a plurality of operation power supply voltages, and thus a peak current is also reduced in this point.

[20] Liquid Crystal Driver

In item 11, the driven device is a liquid crystal display panel having a plurality of liquid crystal display elements disposed in a matrix, and the drive unit outputs a drive signal for driving the liquid crystal display elements.

According to this, it is possible to contribute to a reduction in peak current during the supply restart of the operation power supply voltages, with respect to a configuration in which burn-in prevention of the liquid crystal display elements or element characteristic deterioration prevention is performed by the power supply line discharge in a power supply cutoff state.

The following is a brief description of an effect obtained by the representative embodiments of the invention disclosed in the present application.

That is, it is possible to prevent a through-current from being generated between semiconductor devices even in case that timings of power supply and discharge release are shifted between the semiconductor devices.

FIG. 1 illustrates a display driver which is a first example of a semiconductor device according to embodiments of the invention. A display driver 1 shown in the drawing, although not particularly limited as shown, is formed in one semiconductor substrate such as a single crystal silicon together with other appropriate circuit blocks, as necessary, by a CMOS integrated circuit manufacturing technique.

In FIG. 1, the display driver 1 is controlled by a host device 2, and is supplied with display data and control data from the host device 2. A display panel 3 is shown as a driven device to be driven for display by the display driver 1. Here, one display driver 1 is typically shown, but in the example of the electronic apparatus of FIG. 1, the display panel 3 is driven for display using a plurality of display drivers 1. Although not particularly limited to the embodiment shown, the display driver 1 is supplied with an external logic power supply voltage ExVcc and an external analog power supply voltage ExVaa as external power supply voltages. The external analog power supply voltage ExVaa is a relatively high voltage which is used for driving the display panel 3. The external logic power supply voltage ExVcc is a relatively low voltage which is used for a logic operation of a logic circuit. In case that an electronic apparatus 5 is a portable communication terminal, the host device 2 is configured to include a communication unit capable of being connected to a portable communication network, a WiFi communication network or the like, a protocol processor that performs communication protocol processing using the communication unit, an application processor that performs control of the protocol processor or various data processing control, and peripheral device such as an auxiliary storage device, other external interface circuits or the like. The specific configuration of the host device 2 is not limited thereto, and can be variously changed in accordance with functions capable of being realized by the electronic apparatus 5.

Although not particularly limited to the embodiment shown, in FIG. 1, a liquid crystal display panel is used as the display panel 3. The display panel 3, not particularly shown, is configured such that a plurality of pixels are disposed on a glass substrate in a matrix, and that each of the pixels includes a thin-film transistor and a liquid crystal element which are connected in series to each other. A common potential Vcom is given to the liquid crystal element of each pixel. The selection terminal of the thin-film transistor is connected to gate electrodes Gtd_1 to Gtd_m in units of columns, and the signal terminal of the thin-film transistor is connected to source electrodes Src_1 to Src_n which are disposed in a direction intersecting the gate electrodes Gtd_1 to Gtd_m in units of rows. The line of each pixel of the gate electrodes Gtd_1 to Gtd_m serves as a display line, the display line is selected (scanning of the display line) by the thin-film transistor of the pixel being turned on in units of display lines, and a gradation voltage is applied to the liquid crystal element from the source electrodes Src_1 to Src_n for each selection period (horizontal display period) of the display line. By the thin-film transistor being turned off, the applied gradation voltage is held by a capacitive component of the liquid crystal element until being selected next, and maintains a shut state of the liquid crystal element.

In FIG. 1, the display driver 1 includes a host interface circuit (HIF) 10 that inputs display data from the host device 2 and inputs and outputs control data, a control unit (CNT) 11 that processes the display data and the control data which are input to the host interface circuit 10, a frame buffer memory (FBM) 13 that stores the display data in units of display frames, a drive unit (DRV) 12 that outputs a drive signal to the gate electrodes Gtd_1 to Gtd_m, the source electrodes Src_1 to Src_n, and the like on the basis of the control of the control unit 11, an electrically rewritable non-volatile storage device (NVM) 14, and a power supply unit (PWS) 15.

The host interface circuit 10 includes an image data interface circuit 21 and a system interface circuit 20. The image data interface circuit 21 has an operating mode based on a video mode (also simply referred to as a video mode) of a mobile industry processor interface (MIPI)-display serial interface (DSI) for inputting the display data in synchronization with a display timing, and an operating mode based on an MIPI command mode (also simply referred to as a command mode) for inputting the display data in asynchronization with a display timing. The system interface circuit 20 has an interface function based on, for example, an MIPI, a mobile display digital interface (MDDI) or the like, and inputs and outputs a command input and control data.

The control circuit 11 includes a command and display control circuit 30. The command and display control circuit 30 includes a control logic circuit (CLGC) 34 and a control register circuit (CREG) 33. The control logic circuit (CLGC) 34 stores the control data according to the input command in a corresponding address area of the control register circuit (CREG) 33, and generates an internal timing signal for display control or access control in accordance with the input command. The control data written in the control register circuit 33 is supplied to a corresponding internal circuit. Access to the frame buffer memory 13 or the like is controlled on the basis of an access control signal which is generated by the control logic circuit 34, and display drive control is performed on the frame buffer memory 13 and the drive unit 12 in synchronization with the generated internal timing signal or a display timing signal which is supplied from the host device 2. The drive unit 12 includes a data latch circuit 40, a gradation voltage selection circuit 41, a source driver 42, a gate control driver 43, and the like.

The display data which is input in the video mode is configured such that a display frame is specified by vertical synchronizing signals which are input together, and that a horizontal synchronous period is specified by horizontal synchronizing signals which are input together. With respect to the display data which is input in the video mode, the command and display control circuit 30 is configured such that the display data is latched by the data latch circuit 40 in units of display lines while recognizing the display frame and the horizontal synchronous period in accordance with the vertical synchronizing signals and the horizontal synchronizing signals which are input together, a gradation voltage is selected by the gradation voltage selection circuit 41 on the basis of data in units of the latched display lines, and that the source electrodes Src_1 to Src_n are driven by the selected gradation voltage being received by the source driver 42. The gate control driver 43 sequentially selects gate electrodes Gtdn_1 to Gtd_m in units of horizontal synchronous periods. The common potential Vcom is output by a VCOM control driver which is not shown.

The display data which is input in the command mode is temporarily stored in the frame buffer memory 13 by write control of the command and display control circuit 30, and the stored display data is read out in units of display lines to the data latch circuit 40 for each horizontal synchronous period based on the horizontal synchronizing signals generated inside of the command and display control circuit 30. A gradation voltage is selected by the gradation voltage selection circuit 41 on the basis of data in units of latched display lines, and the source electrodes Src_1 to Src_n are driven by the selected gradation voltage being received by the source driver 42. The gate control driver 43 sequentially selects gate electrodes Gtdn_1 to Gtdn_m in units of horizontal synchronous periods. The common potential Vcom is output by a VCOM driver which is not shown.

The display driver 1 is configured such that the power supply unit 15 receives the external logic power supply voltage ExVcc and the external analog power supply voltage ExVaa which are output from the external battery power supply 4 (not shown) and generates an internal power supply voltage, to thereby supply the generated voltage to each unit. The internal power supply voltage, not particularly limited, serves as a logic power supply voltage VDD which is generated from the logic power supply voltage ExVcc, analog power supply voltages VSP, VSN, VGH, and VGL which are generated by a DCDC converter 50 on the basis of the external analog power supply voltage ExVaa, and the like. Although not particularly limited, the analog power supply voltages VSP, VSN, VGH, and VGL are formed by boosting the external analog power supply voltage ExVaa using the DCDC converter 50. The DCDC converter 50 may adopt a known circuit configuration using a buffer amplifier, a non-inverting amplifier, a resistive voltage-dividing circuit, and the like.

Although not particularly shown, in power supply cutoff performed by a power supply switch or the like on a system which is not shown, a display off-sequence of discharging charges of all the pixels before a power supply is set to have an operation guarantee voltage or lower is executed. A process of discharging pixel charges in the display off-sequence is performed. The reason for discharging pixel charges through the display off-sequence during the power supply cutoff is to prevent a case from occurring in which due to undesired charge information remaining in the pixel, a display speckle is caused, or burn-in and characteristic deterioration are caused in the pixel. As a specific method of the display off-sequence, for example, control may be adopted which causes the gate control driver 43 to select all the gate electrodes Gtd_1 to Gtd_m (all the display lines), causes the source driver 42 to supply a ground potential to all the source electrodes Src_1 to Src_n, and causes the VCOM driver to set the common potential Vcom to the ground potential. As another example, the gate control driver 43 may be caused to select all the gate electrodes Gtd_1 to Gtd_m (all the display lines), and the data latch circuit 40 may be caused to latch black data. As still another example, the gate control driver 43 may be caused to select all the gate electrodes Gtd_1 to Gtd_m (all the display lines), and the gradation voltage selection circuit 41 may be caused to select a black gradation voltage. In either example, finally, the supply of the power supply voltages VSP, VSN, VGH, and VGL to the source driver 42, the gradation voltage selection circuit 41, and the gate control driver 43 is stopped, and a power supply line 52 is discharged to the ground for each power supply. Undesired charges do not remain in these internal circuits and pixels. A discharge switch circuit 51 is provided in order to selectively perform discharge with respect to the power supply line 52. The control of the power supply off-sequence and the control of the discharge switch circuit 51 and the DCDC converter 50 are performed on the basis of the command and the control data which are given from the host device 2.

Next, the control of the discharge switch circuit 51 will be described.

A case is assumed in which one display panel 3 is driven using a plurality of display drivers 1, and thus a power supply terminal 53 allowing electrical conduction of the power supply line 52 of the display driver 1 at the outside is provided. In case that one display panel 3 is driven using a plurality of display drivers 1, corresponding power supply terminals 53 of each display driver 1 are connected in common to an external line 54. This is because, in case that an error is present in the analog power supply voltages VSP, VSN, VGH, and VGL between these liquid crystal drivers 1, a difference is caused in display luminance even in a case of the same gradation data. In case that one display panel 3 is driven using one display driver 1, the power supply terminal may be set to be in a floating state.

Figure 2:
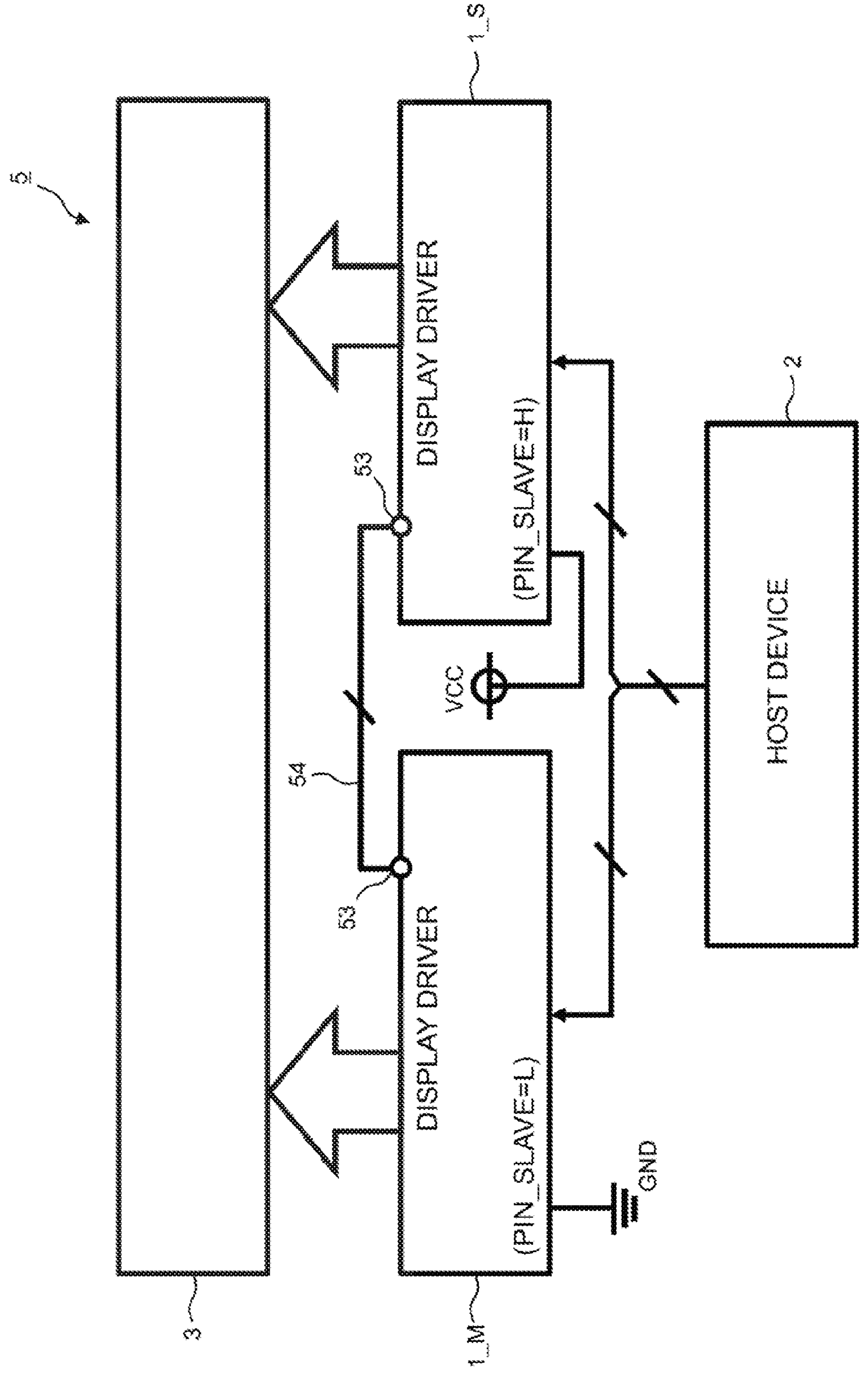
FIG. 2 is a block diagram illustrating an example of an electronic apparatus that drives a display panel using two semiconductor devices of FIG. 1.
Figure 3:
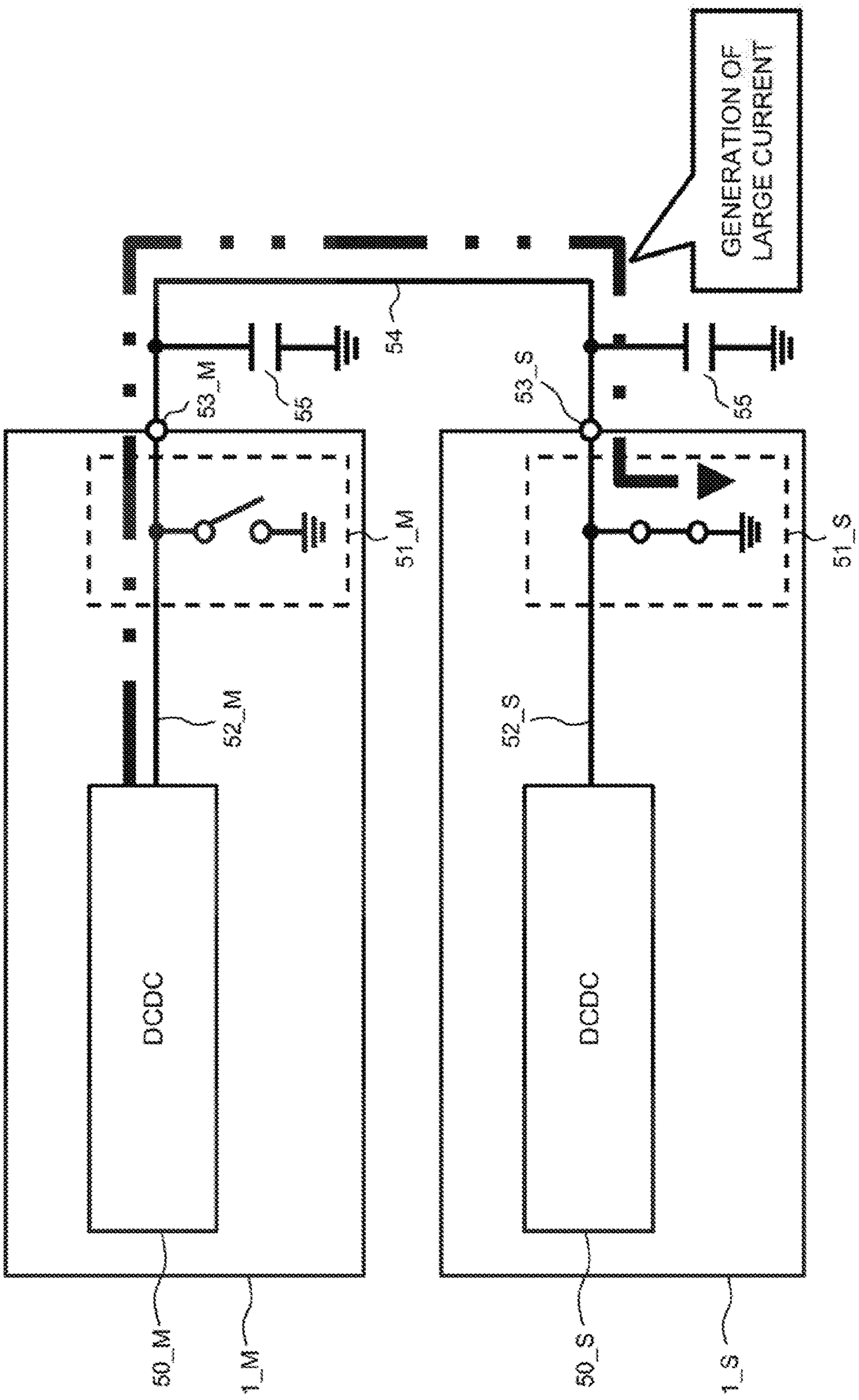
FIG. 3 is a diagram schematically illustrating a state where a through-current flows in case that timings of power supply and discharge release are shifted together in each semiconductor device in a state where power supply lines of an operation power supply voltage generated in each semiconductor device are connected to each other at the outside in the electronic apparatus of FIG. 2.

The control unit 11 controls the output operation of a drive signal which is performed by the drive unit 12, and controls the supply and cutoff of the analog power supply voltages VSP, VSN, VGH, and VGL to the drive unit 12 which are performed by the power supply unit 15. As the display off-sequence during the power supply cutoff has been described, the cutoff of the analog power supply voltages VSP, VSN, VGH, and VGL is performed by both the supply stop of the analog power supply voltages VSP, VSN, VGH, and VGL which is performed by the DCDC converter 50 and the discharge of the power supply line 52 which is performed by the discharge switch circuit 51. The supply of the analog power supply voltages VSP, VSN, VGH, and VGL is performed by both the supply start of the analog power supply voltages VSP, VSN, VGH, and VGL which is performed by the DCDC converter 50 and the discharge release of the power supply line 52 which is performed by the discharge switch circuit 51. The control aspect of the supply and cutoff of the analog power supply voltages VSP, VSN, VGH, and VGL is determined in accordance with the operating mode of the display driver 1 in a point of the control aspect of the discharge switch circuit 51. That is, since the control aspect is considered in which one display panel is controlled for display using a plurality of display drivers, as illustrated in FIG. 2, the operating mode of the display driver 1 to be focused herein is a first mode (hereinafter, also simply denoted by a master mode) and a second mode (hereinafter, also simply denoted by a slave mode). In each of the master mode and the slave mode, the control unit 11 controls the timings of the supply stop of the analog power supply voltages VSP, VSN, VGH, and VGL, the discharge start of the power supply line 52 and the discharge release of the power supply line 52 so as to be the same as each other, and delays the supply start timing of the analog power supply voltages VSP, VSN, VGH, and VGL in the slave mode as compared to that in the master mode. In other words, both the supply start and the discharge release of the power supply voltage are not shifted by a predetermined timing between the master mode and the slave mode, only the supply start of the power supply voltage is shifted to suppress a peak current, and the discharge release of the power supply line 52 is not reversed, so that a through-current is not generated from the power supply line 52 on the master side through the external line 54 to the discharge switch circuit 51 of the power supply line 52 on the slave side. As illustrated in FIG. 3, in case that both the supply start and the discharge release of the analog power supply voltage are shifted by a predetermined timing between the master mode and the slave mode, a large through-current is generated from a power supply line 52_M on the master side where the supply of the analog power supply voltage is previously started through the external line 54, and through a power supply switch circuit 51_S on the slave side where the discharge state is yet maintained at that point in time. In FIG. 3, 55 is a general term of a power supply stabilization capacitor.

A further specific description will be given. As illustrated in FIG. 2, the setting of the operating mode is determined by, for example, a mode signal PIN_SLAVE which is input from a mode terminal. In case that the mode signal PIN_SLAVE is set to be at a low level (L), the master mode is set. In case that the mode signal PIN_SLAVE is set to be at a high level (H), the slave mode is set. Specifically, the master mode is set by the pull-down of the mode terminal, and the slave mode is set by the pull-up thereof.

The control unit 11 includes a power supply offset control signal generation circuit 31 and a register circuit (DREG) 32 for control of delaying the supply start timing of the power supply voltage. The register circuit 32 holds delay time data Dofst for delaying the supply start timing of the analog power supply voltages VSP, VSN, VGH, and VGL in the slave mode as compared to that in the master mode. Regarding the delay time data Dofst, delay time data Dofst which is previously written in the non-volatile storage device 14 may be internally transmitted from the non-volatile storage device 14 to the register circuit 32 in response to a command (power supply startup offset command) from the host device 2. Writing in the non-volatile storage device 14 may be appropriately performed by write data and a write command from the host device 2.

The power supply offset control signal generation circuit 31 inputs the mode signal PIN_SLAVE, a command control from the control register circuit 33, and the delay time data Dofst from the register circuit 32. In case that a control command of sleep release is output from the command register circuit 33 on the basis of a command (SLPOUT) such as sleep release (sleep out) from the host device 2, the power supply offset control signal generation circuit 31 activates an offset time signal 35 in wait for an elapse of an offset time according to the delay time data Dofst in response to the control command of sleep release, in case that the slave mode is designated by the mode signal PIN_SLAVE. In case that the master mode is designated by the mode signal PIN_SLAVE, the offset time signal 35 is activated immediately in response to the control command of sleep release. In case that the control command of sleep release is received, the power supply unit 15 controls the discharge switch circuit 51 from an on-state to an off-state in response thereto and starts the discharge release of the power supply line 52. In addition, the power supply unit brings the DCDC converter 50 into operation in wait for the offset time signal 35 being activated and starts an operation for supplying the analog power supply voltages VSP, VSN, VGH, and VGL to the power supply line 52. The activation timing of the offset time signal 35 is delayed by the amount of the delay time data Dofst in the slave mode, and such a delay is not caused in the master mode.

In case that a control command of sleep setting is output from the command register circuit 33 on the basis of a command (SLPIN) such as sleep setting (sleep-in) from the host device 2, the power supply unit 15 ignores the state of the offset time signal 35, and stops the operation of the DCDC converter 50 in response to the control command of sleep setting to thereby cut off the supply of the power supply voltages VSP, VSN, VGH, and VGL. The power supply unit controls the power supply switch circuit 51 from an off-state to an on-state in synchronization therewith and starts to discharge the analog power supply line 52. The operation of sleep setting is not changed both in the slave mode and in the master mode.

The description of the operation timing control of the supply and cutoff of the analog power supply voltages VSP, VSN, VGH, and VGL has focused primarily on a difference between the master mode and the slave mode. Since there are multiple types of analog power supply voltages VSP, VSN, VGH, and VGL, it goes without saying that, from the viewpoint of in-rush current relaxation during the supply of power, power supply timings are shifted for a predetermined time between the respective power supply voltages of the analog power supply voltages VSP, VSN, VGH, and VGL. Therefore, the discharge timing during power supply cutoff has the same shift as the shift of power supply start between the analog power supply voltages VSP, VSN, VGH, and VGL in the master mode. The discharge switch circuit 51 includes a discharge switch for each of the analog power supply voltages VSP, VSN, VGH, and VGL.

Figure 4:
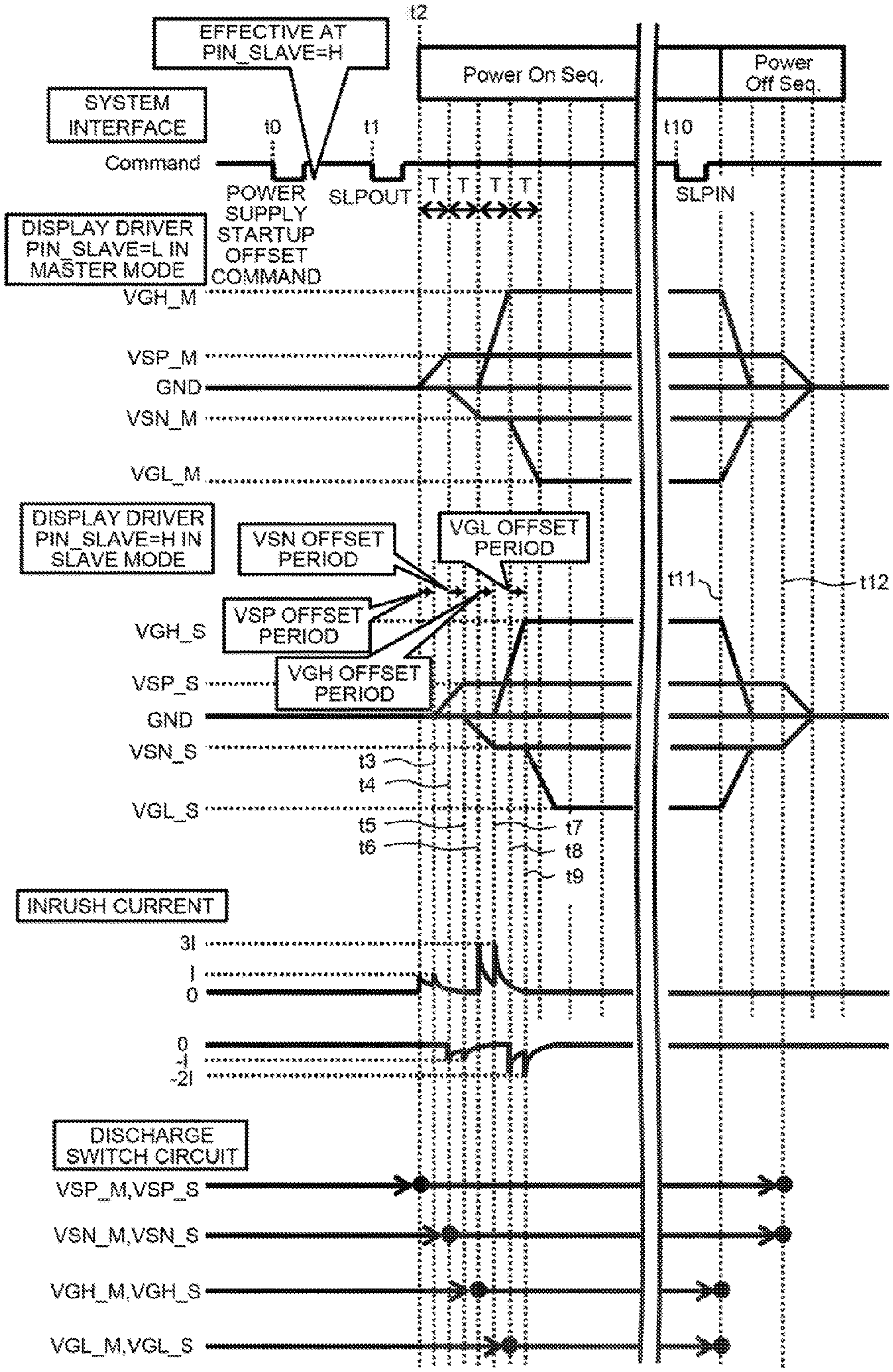
FIG. 4 is a timing diagram illustrating operation timings of power supply and power supply cutoff of two semiconductor devices of FIG. 2.

FIG. 4 shows a specific example of operation timings of power supply and power supply cutoff for each of the analog power supply voltages VSP, VSN, VGH, and VGL.

In case that the power supply startup offset command is issued at time t0 by the host device 2, the delay time data is transmitted from the register circuit 32 to the power supply offset control signal generation circuit 31, and the host device issues the command of sleep release at time t1. Since a display driver 1_M in the master mode ignores the delay time data, the supply of a power supply voltage VSP_M and the off operation of a discharge switch for the power supply voltage VSP_M are started at time t2 in response to the command of sleep release. A display driver 1_S in the slave mode starts the supply of a power supply voltage VSP_S at time t3 in wait for an elapse of a delay time (VPS offset period) according to the delay time data Dofst, but the off operation of a discharge switch for the power supply voltage VSP_S is started from time t2 similarly to the display driver 1_M in the master mode. Hereinafter, similarly, in the display driver 1_M in the master mode, the supply of a power supply voltage VSN_M and the off operation of a discharge switch for the power supply voltage VSN_M are started from time t4, the supply of a power supply voltage VGH_M and the off operation of a discharge switch for the power supply voltage VGH_M are started from time t6, and the supply of a power supply voltage VGL_M and the off operation of a discharge switch for the power supply voltage VGL_M are started from time t8. In the display driver 1_S in the slave mode, the supply operation of a power supply voltage VSN_S is started from time t5 in wait for an elapse of a delay time (VSN offset period) from time t4, the supply operation of a power supply voltage VGH_S is started from time t7 in wait for an elapse of a delay time (VGH offset period) from time t6, and the supply operation of the power supply voltage VGL_S is started from time t9 in wait for an elapse of a delay time (VGL offset period) from time t8. However, the start of the off operation of the discharge switch of each power supply is set to be at the same timing as that of the display driver 1_M in the master mode.

In case that the host device issues the command of sleep setting at time t10, the display driver 1_M in the master mode and the display driver 1_S in the slave mode sequentially generate operation power supply voltages, forming a pair, of which the polarities are different from each other and of which the voltage values are substantially equal to each other in terms of an absolute value, with respect to the supply stop of the analog power supply voltages VSP, VSN, VGH, and VGL and the discharge of the power supply lines. There is substantially no difference between timings in the master mode and the slave mode. The supply stop of the power supply voltages VGH and VGL on the high-potential side in terms of an absolute value and the discharge of the power supply lines are started at time t11, and the supply stop of the power supply voltages VSP and VSN on the low-potential side in terms of an absolute value and the discharge of the power supply lines are started at time t12.

Figure 5:
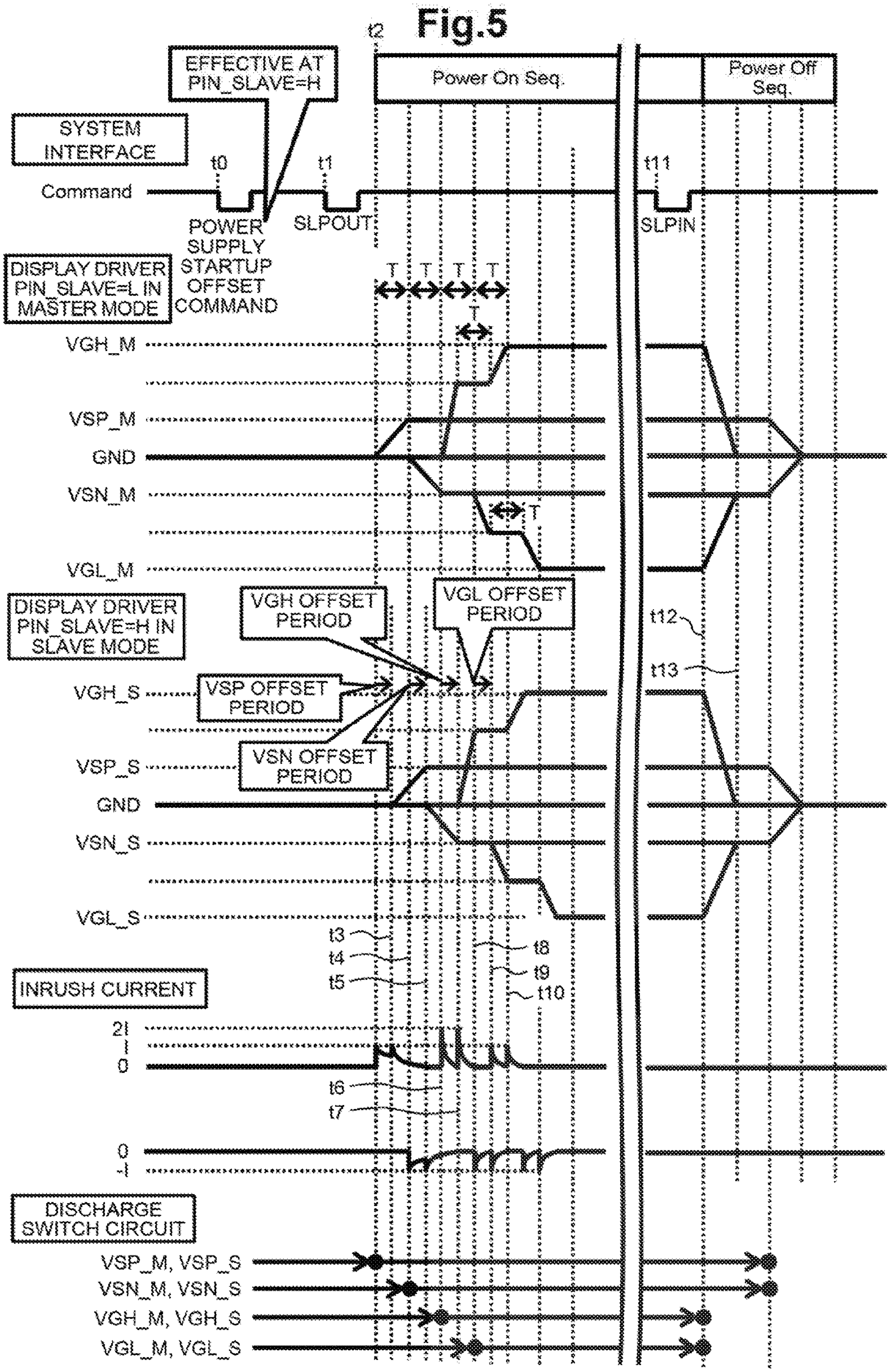
FIG. 5 is a timing diagram illustrating operation timings of power supply and power supply cutoff of two semiconductor devices of FIG. 2 in case that a so-called soft start is adopted in a power supply start.

FIG. 5 illustrates operation timings of power supply and power supply cutoff of two semiconductor devices of FIG. 2 in case that so-called soft start is adopted in the power supply start. The soft start refers to a power supply operation in which the power supply operation is temporarily halted and restarted after an elapse of a predetermined time from the power supply start from the power supply unit 15 to the drive unit 12. In the example of FIG. 5, such an operation is adopted in the supply of the power supply voltages VGH and VGL on the high-potential side in terms of an absolute value. For example, in the display driver 1_M in the master mode, in case that the supply of the power supply voltage VGH_M is started from time t6, the supply operation is temporarily halted at a stage of reaching a voltage twice as high as a power supply voltage VPS_M, and then the supply operation is restarted after an elapse of a predetermined time, for example, a time T. Likewise, in the display driver 1_M in the master mode, in case that the supply of the power supply voltage VGL_M is started from time t8, the supply operation is temporarily halted at a stage of reaching a voltage twice as high as a power supply voltage VPN_M, and then the supply operation is restarted after an elapse of the predetermined time T. In the display driver 1_S in the slave mode, the same soft start is also performed. Even in case that the soft start is adopted in the power supply start, the discharge release (turn-off of a discharge switch) timing of the discharge switch circuit 51 in that case is the same as that in FIG. 4. In case that the soft start is adopted in the power supply start, as obvious from an in-rush current waveform of FIG. 5, a current peak can be suppressed as compared to that in FIG. 4.

Figure 6:
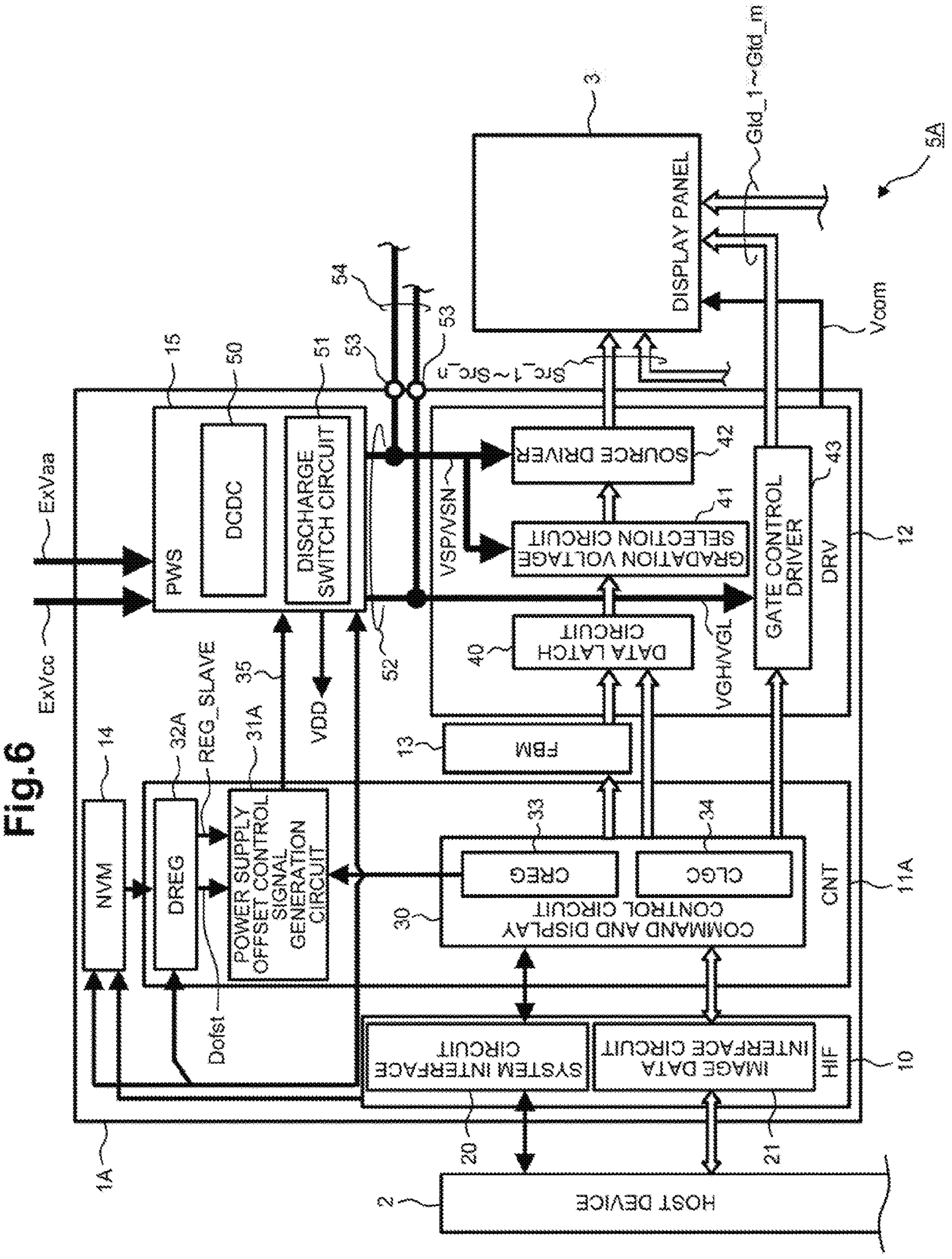
FIG. 6 is a block diagram illustrating a second example of a semiconductor device according to one embodiment of the invention.

FIG. 6 illustrates a display driver according to a second example of a semiconductor device according to the invention. A display driver 1A shown in the drawing is different from the display driver 1 of FIG. 1 in a method of setting the master mode and the slave mode. That is, the master mode or the slave mode of the liquid crystal driver 1A is determined by the value of mode data REG_SLAVE written in a register circuit 32A. In case that the value of the mode data REG_SLAVE is 1, the slave mode is set. In case that the value of the mode data REG_SLAVE is 0, the master mode is set. In case that the mode data REG_SLAVE is issued from the host device 2, the mode data REG_SLAVE and the delay time data Dofst are transmitted from the register 32 to a power supply startup offset control signal generation circuit 31A. The power supply startup offset control signal generation circuit 31A operates in the master mode in case that the value of mode data EG_SLAVE is 0 at the time of issuing a sleep release command from the host device 2, and activates the offset time signal 35 from the beginning. The above circuit operates in the slave mode in case that the value of the mode data EG_SLAVE is 1, and activates the offset time signal 35 in wait for an elapse of a delay time represented by the delay time data Dofst. Similarly to FIG. 1, the power supply unit 15 receiving this signal delays the supply start timing of the analog power supply voltages VSP, VSN, VGH, and VGL in a case of the slave mode, and does not delay a timing of discharge release. Similarly to the above, the delay time is a time until the offset time signal 35 is activated. Other points are the same as those of the embodiment in FIG. 1, and thus the detailed description thereof will not be given.

The mode data REG_SLAVE may be previously written in the non-volatile storage device 14, and may be internally transmitted from the non-volatile storage device 14 to the register circuit 32A in response to the command (power supply startup offset command) from the host device 2. Writing in the non-volatile storage device 14 may be appropriately performed by write data and a write command from the host device 2. Similarly to the liquid crystal driver 1 of FIG. 1, the delay time data Dofst for the register circuit 32A may be transmitted from the non-volatile storage device 14, and may be appropriately set so as to be rewritable from host device 2. Even in case that the non-volatile storage device 14 has the delay time data Dofst in advance, it goes without saying that the delay time data may be appropriately rewritten and reset from the host device 2.

Figure 7:
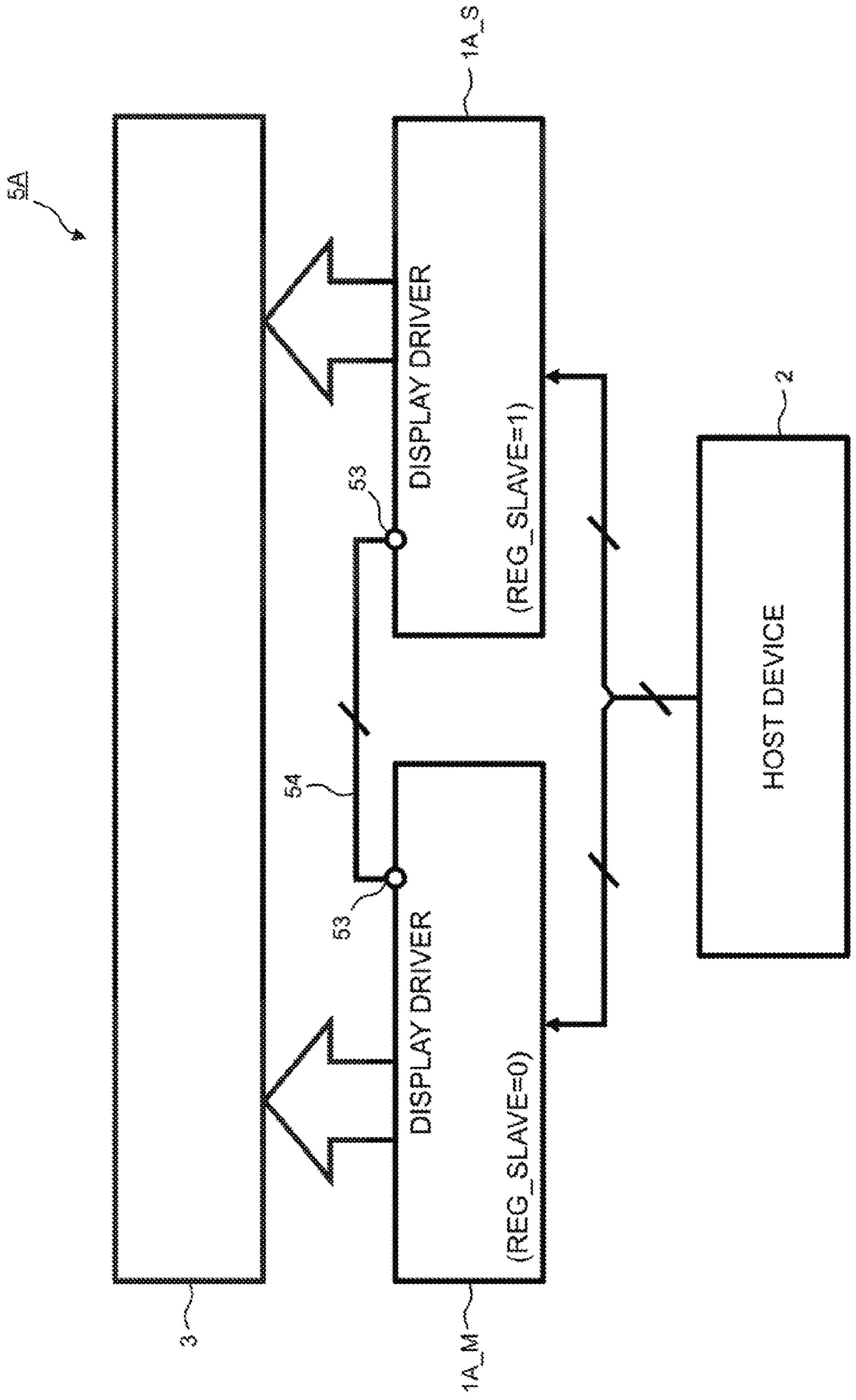
FIG. 7 is a block diagram illustrating an example of an electronic apparatus that drives a display panel using two semiconductor devices of FIG. 6.
Figure 8:
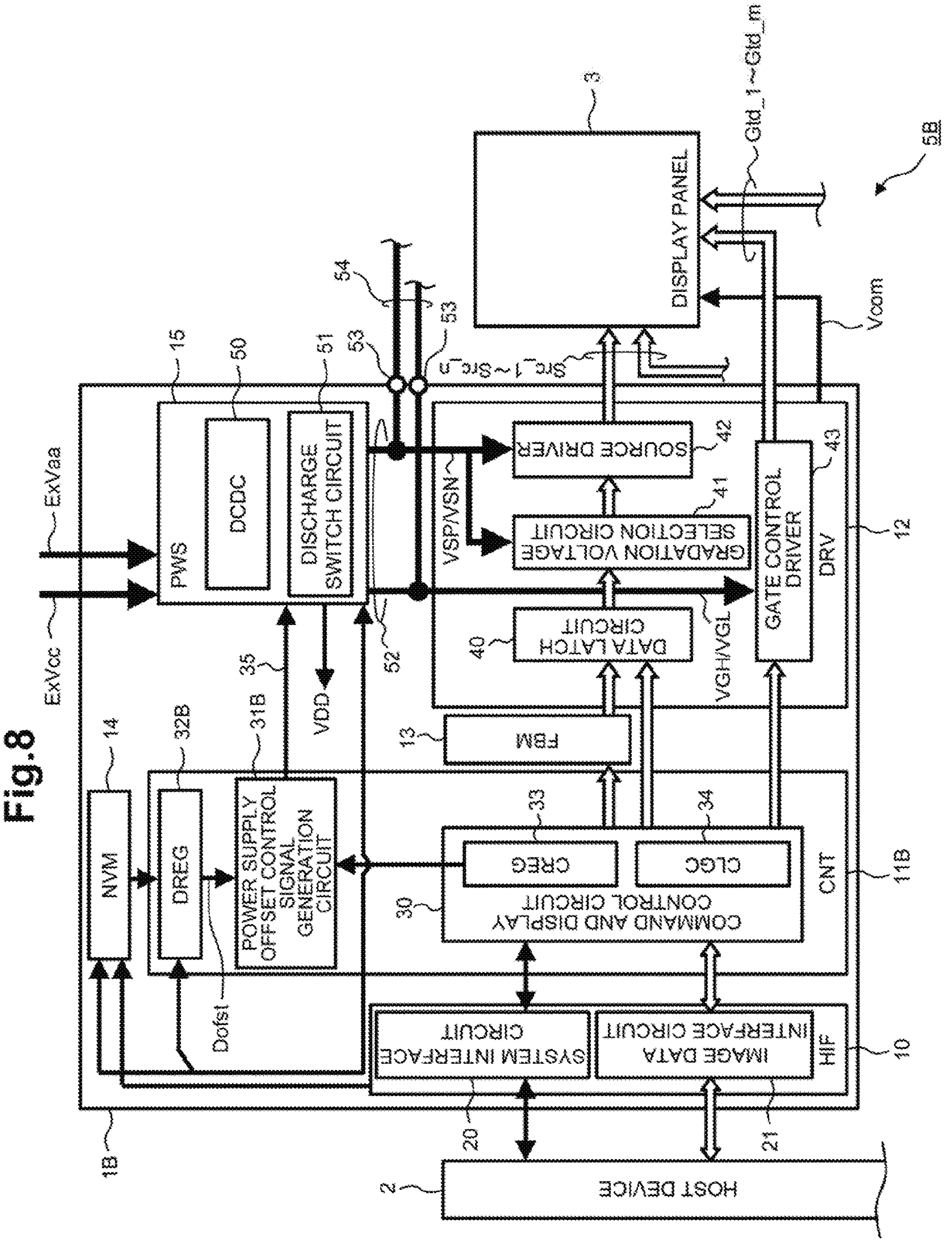
FIG. 8 is a block diagram illustrating a third example of a semiconductor device according to one embodiment of the invention.

FIG. 7 illustrates a system configuration of an electronic apparatus 5A using two liquid crystal drivers 1A of FIG. 6. In such a system configuration, the same operational effect as that in FIG. 2 is also exhibited. That is, in case that one display panel 3 is driven using a plurality of display drivers 1A, it is assumed that the external power supply terminals 53 of the respective display drivers 1A are caused to allow electrical conduction to each other in order to cancel errors of the analog power supply voltages VSP, VSN, VGH, and VGL between the display drivers 1A, the power supply unit 15 of each display driver 1A is operable by receiving an instruction for the release of a low power consumption state or the like, and the supply start timings of the analog power supply voltages VSP, VSN, VGH, and VGL are shifted between a display driver 1A_S in the slave mode and a display driver 1A_M in the master mode. Thereby, since an excessive in-rush current is prevented from being generated, and the timings of discharge release of the power supply line 52 become equal to each other between the display driver 1A_S in the slave mode and the display driver 1A_M in the master mode, there is no concern of a through-current flowing from the power supply unit 15 on the master side to the power supply unit 15 on the slave side due to a shift in the discharge release timing.

FIG. 7 illustrates a display driver which is a third example of the semiconductor device according to one embodiment of the invention and an electronic apparatus 5B using the display driver. A display driver 1B shown in the drawing is different from the above display driver in a method of setting the master mode and the slave mode, and setting is performed using the delay time data Dofst. That is, a power supply offset control signal generation circuit 31B of a control circuit 11B recognizes the master mode in case that the delay time data Dofst indicates delay 0, and recognizes the slave mode in case that the delay time data Dofst does not indicate delay 0. The power supply offset control signal generation circuit 31B may determine the activation timing of the offset time signal 35 in accordance with the delay time indicated by the delay time data Dofst.

Meanwhile, in the above, a difference between the master mode and the slave mode of the display drivers 1, 1A, and 1B has been described as a shift in the supply start timings of the analog power supply voltages VSP, VSN, VGH, and VGL therebetween, but it has to be noted that there is another significance in other circuit portions as a difference between the master mode and the slave mode. In that case, the mode data REG_SLAVE and mode signal OIN_SLAVE are also supplied to other circuits. Particularly, in a case of the third example, the delay time data Dofst itself of a plurality of bits may be supplied to the other circuits, an internal mode signal may be formed by detecting all the bits of 0, and the signal may be supplied to the other circuits.

As described above, while the invention devised by the inventor has been described specifically based on the embodiments thereof, the embodiments of the invention are not limited to the illustrative embodiments, and it goes without saying that various changes and modifications may be made without departing from the scope thereof.

In the above, a description has been given of a case where an external power supply voltage Vaa is received by the power supply unit 15 and the analog power supply voltages VSP, VSN, VGH, and VGL are generated, but the invention is not limited thereto. Only VGH and VGL are generated from the external power supply voltage Vaa, and thus VSP and VSN may be generated from VSP' and VSN' which are input separately from Vaa. In addition, external power supplies VSP' and VSN' are input instead of the external power supply voltage Vaa, and thus the analog power supply voltages VSP, VSN, VGH, and VGL may be generated from VSP' and VSN'.

In the above embodiment, it is natural that the first mode is set to the master mode, and the second mode is set to the slave mode, but the first mode and the second mode may be used as an operating mode relating to only the power supply operation. It goes without saying that the first mode and the second mode may be given a separate meaning from that utilized in an illustrative embodiment.

The semiconductor device according to the embodiments of the invention is not limited to the display driver, and the driven device is not limited to the liquid crystal display panel. Other display panels such as an electroluminescent panel may be used. The driven device to be driven by the semiconductor device according to the invention is not limited to the display panel, and may be, for example, other circuit devices required to return a circuit state during operation stop to an initial state.

Other circuit modules may be mixed into the semiconductor device. In a case of a semiconductor device which is used for drive control of a display panel formed so as to overlap a touch panel on the surface, it is also possible to mix a touch controller that performs touch detection control of the touch panel and a local processor that performs a coordinate arithmetic operation or the like of a touch position, in addition to the display driver.

What is claimed is:

1. A semiconductor device comprising:

a power supply unit;

a drive unit configured to output a plurality of drive signals using a plurality of operation power supply voltages which are supplied from the power supply unit;

an external interface unit configured to input a command and data from an outside device; and a control unit configured to control an output operation of the drive signals which is performed by the drive unit, the control unit configured to control supply and cutoff of the operation power supply voltages to the drive unit which are performed by the power supply unit, wherein the semiconductor device includes an external power supply terminal capable of connecting a power supply line of the operation power supply voltages to the outside device external of the semiconductor device, wherein the control unit is configured to cutoff the operation power supply voltages by both supply stop of the operation power supply voltages and discharge of the power supply line, wherein the control unit is configured to supply operation power supply voltage by both supply start of the operation power supply voltages and discharge release of the power supply line, the semiconductor device has a first mode and a second mode, and the control unit operable to control timings of the supply stop of the operation power supply voltages, discharge start of the power supply line and the discharge release of the power supply line so as to be the same as each other in each of the first mode and the second mode, and delay a supply start timing of the operation power supply voltages in the second mode as compared to that in the first mode.

2. The semiconductor device according to claim 1, wherein operation in the first mode or the second mode is determined by pull-up or pull-down of a predetermined external terminal.

3. The semiconductor device according to claim 2, further comprising a register by which a shift amount of the supply start timing is set to be variable, wherein the register is rewritable from the outside device through the external interface unit.

4. The semiconductor device according to claim 1, wherein the first mode or the second mode is determined by mode data which is held by an electrically rewritable nonvolatile storage device.

5. The semiconductor device according to claim 4, further comprising:

a register by which a shift amount of the power supply start timing is set to be variable, wherein the register is rewritable from the outside device through the external interface unit.

6. The semiconductor device according to claim 1, further comprising:

a register by which a shift amount of the supply start timing is set to be variable, and wherein the control unit determines the first mode in case that the shift amount which is set by the register is zero, and determines the second mode in case that the shift amount which is set by the register is larger than zero.

7. The semiconductor device according to claim 1, wherein the control unit is operable to temporarily halt and restart a power supply operation after an elapse of a predetermined time from power supply start from the power supply unit to the drive unit.

8. The semiconductor device according to claim 1, wherein in the first mode, the control unit is operable to start the supply of the operation power supply voltages after an elapse of a first time from generation of a first event, release the discharge of the power supply line, and start the supply stop of the operation power supply voltages and the discharge of the power supply line after an elapse of a second time from generation of a second event, and in the second mode, the control unit is operable to release the discharge of the power supply line after an elapse of the first time from the generation of the first event, start the supply of the operation power supply voltages after an elapse of a third time thereafter, and start the supply stop of the operation power supply voltages and the discharge of the power supply line after an elapse of the second time the generation of the second event.

9. The semiconductor device according to claim 8, wherein the second event is a setting instruction of a low power consumption mode for the drive unit based on a low power consumption mode setting command which is supplied to the external interface unit, and the first event is a release instruction of the low power consumption mode for the drive unit based on a low power consumption mode release command which is supplied to the external interface unit.

10. The semiconductor device according to claim 8, wherein the control unit is operable to shift timings of the supply start of each operation power supply voltage and the discharge release of the power supply line between the plurality of operation power supply voltages.

11. The semiconductor device according to claim 1, wherein the drive unit is operable to output a drive signal for driving a plurality of liquid crystal display elements of a liquid crystal display panel having the liquid crystal display elements disposed in a matrix.

12. An electronic apparatus comprising:

a plurality of semiconductor devices; and a driven device in a state of connection to the plurality of semiconductor devices, wherein each of the semiconductor devices comprises:

a power supply unit;

a drive unit configured to output a plurality of drive signals using a plurality of operation power supply voltages which are supplied from the power supply unit;

an external interface unit that is configured to receive a command and data from an outside device;

a control unit configured to control an output operation of a drive signal which is performed by the drive unit and configured to control supply and cutoff of the operation power supply voltages to the drive unit which are performed by the power supply unit, and an external power supply terminal capable of connecting a power supply line of the operation power supply voltages to the outside device external of the semiconductor device, wherein the control unit is operable to cutoff operation power supply voltages by both stopping the operation power supply voltages and discharging the power supply line, wherein the control unit is operable to supply operation power supply voltage by both starting the operation power supply voltages and discharging release of the power supply line, the external power supply terminal of each of the semiconductor devices is connected in common to each corresponding power supply, and the control unit in each of the plurality of semiconductor devices is operable to shift a supply start timing of the operation power supply voltages between the semiconductor devices, and control timings of the supply stop of the operation power supply voltage, discharge start of the power supply line, and the discharge release of the power supply line so as to be the same as each other between the semiconductor devices.

13. The electronic apparatus according to claim 12, wherein the semiconductor device has a first mode and a second mode, the control unit is operable to control the respective timings of the supply stop of the operation power supply voltages, the discharge start of the power supply line, and the discharge release of the power supply line so as to be the same as each other between the first mode and the second mode, and delay a supply start timing of the operation power supply voltages in the second mode as compared to that in the first mode, and the control unit includes a register by which a delay amount of the supply start timing of the operation power supply voltages is set to be variable, the register being rewritable from the outside device through the external interface unit.

14. The electronic apparatus according to claim 13, wherein the first mode or the second mode is determined by pull-up or pull-down of a predetermined external terminal.

15. The electronic apparatus according to claim 13, wherein the first mode or the second mode is determined by mode data which is held by an electrically rewritable non-volatile storage device.

16. The electronic apparatus according to claim 13, wherein the control unit is operable to determine the first mode in case that a shift amount which is set by the register is zero, and determine the second mode in case that the shift amount which is set by the register is larger than zero.

17. The electronic apparatus according to claim 13, wherein in the first mode, the control unit is configured to start the supply of the operation power supply voltages after an elapse of a first time from generation of a first event, release the discharge of the power supply line, and start the supply stop of the operation power supply voltages and the discharge of the power supply line after an elapse of a second time from generation of a second event, and in the second mode, the control unit is configured to release the discharge of the power supply line after an elapse of the first time from the generation of the first event, start the supply of the operation power supply voltages after an elapse of a third time thereafter, and start the supply stop of the operation power supply voltages and the discharge of the power supply line after an elapse of the second time from the generation of the second event.

18. The electronic apparatus according to claim 17, wherein the second event is a setting instruction of a low power consumption mode for the drive unit based on a low power consumption mode setting command which is supplied to the external interface unit, and the first event is a release instruction of the low power consumption mode for the drive unit based on a low power consumption mode release command which is supplied to the external interface unit.

19. The electronic apparatus according to claim 17, wherein the control unit is configured to shift timings of the supply start of each operation power supply voltage and the discharge release of the power supply line between the plurality of operation power supply voltages.

20. The electronic apparatus according to claim 12, wherein the control unit is operable to temporarily halt and restate a power supply operation after an elapse of a predetermined time from power supply start from the power supply unit to the drive unit.

21. The electronic apparatus according to claim 12, wherein the driven device is a liquid crystal display panel having a plurality of liquid crystal display elements disposed in a matrix, and the drive unit is configured to output the drive signal for driving the liquid crystal display elements.

* * * * *